United States Patent

[11] 3,615,215

[72] Inventors: Hans Von Dohren, Frankfurt am Main; Andreas Basch, Niedereschbach, both of Germany
[21] Appl. No.: 882,966
[22] Filed: Dec. 8, 1969
[45] Patented: Oct. 26, 1971
[73] Assignee: Varta Aktiengesellschaft, Frankfurt am Main, Germany
[32] Priority: Dec. 12, 1968
[33] Germany
[31] P 18 14 108.7

[54] RANEY CATALYST FOR GENERATING HYDROGEN BY DECOMPOSITION OF BORANES
6 Claims, 2 Drawing Figs.

[52] U.S. Cl. .................................................. 23/211, 23/59, 23/110, 252/472
[51] Int. Cl. .................................................. C01b 1/02, C01b 1/25
[50] Field of Search .................................................. 23/211, 210, 212, 59

[56] References Cited
UNITED STATES PATENTS

| | | | |
|---|---|---|---|
| 2,928,891 | 3/1960 | Justi et al. | 136/120 X |
| 3,210,157 | 10/1965 | Lewis, Jr. et al. | 23/211 |
| 3,448,060 | 6/1969 | Mason | 23/212 X |
| 3,454,364 | 7/1969 | Sturm et al. | 23/212 |

Primary Examiner—Edward Stern
Attorney—Michael S. Striker

ABSTRACT: Hydrogen is generated by catalytic decomposition of boron hydrides in the presence of a Raney catalyst having from 10 to 97.5 percent by weight of nickel and from 2.5 to 90 percent by weight of iron in the crystal lattice.

RANEY CATALYST FOR GENERATING HYDROGEN BY DECOMPOSITION OF BORANES

BACKGROUND OF THE INVENTION

For fuel cells boron hydrides (boranes) are used as the hydrogen source by carrying out a catalytic decomposition of the borane in a hydrogen generator. It has already been proposed to use instead of noble metals of the VIII group of the periodic system of the elements Raney nickel catalysts for this decomposition step.

However, the rate of decomposition is rather slow or, if only a shorter time is available the decomposition is highly incomplete and, accordingly, the hydrogen generation is small. For instance, with Raney nickel catalysts decomposition times are necessary close to 1 hour.

It is therefore an object of the present invention to provide for a catalyst for the borane decomposition which permits a substantially higher output of hydrogen in a substantially reduced period of time.

SUMMARY OF THE INVENTION

This object is met by a process wherein a water-soluble borane, for instance sodium borane ($NaBH_4$), is subjected to catalytic decomposition in the presence of a Raney catalyst having from 10 to 97.5% by weight of nickel and from 2.5 to 90% by weight of iron in the crystal lattice.

The novel features which are considered as characteristic for the invention are set forth in particular in the appended claims the invention itself, however, both as to its construction and its method of use, together with additional objects and advantages thereof, will be best understood from the following description of specific embodiments when read in connection with the accompanying drawings.

DESCRIPTION OF THE PREFERRED EMBODIMENTS

Figure 1:
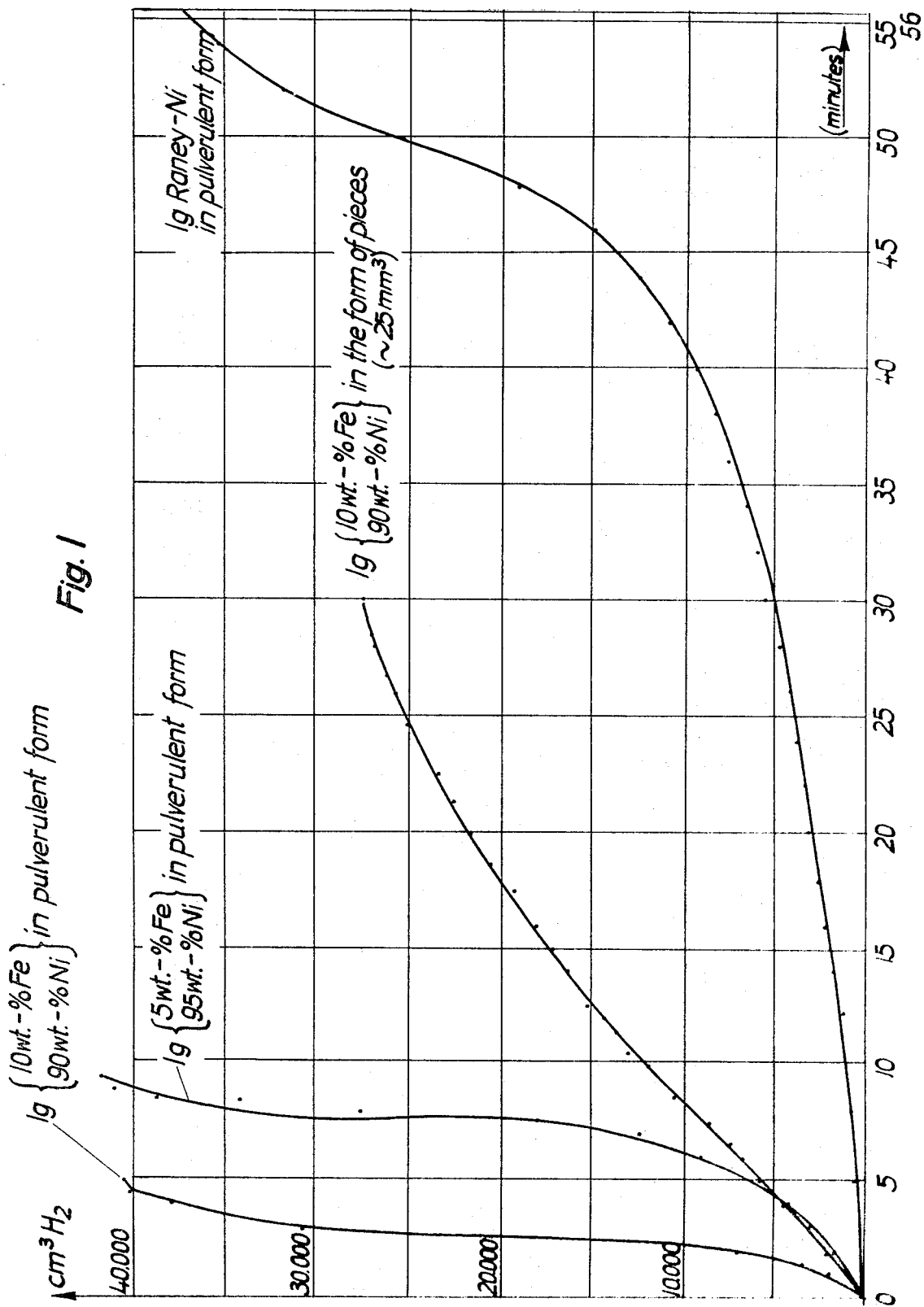
FIG. 1 shows a graph illustrating the time of reaction necessary to generate the shown amounts of hydrogen for various contents of iron in the Raney nickel catalyst and in comparison with a Raney nickel catalyst not containing any iron.

During the decomposition of borane solutions a large amount of heat is generated. The temperature increase is assured by the very high speed of decomposition of the borane solution in the employed catalyst of the invention.

It is preferred to use a Raney catalyst which, in addition to nickel, contains between 10 and 15% by weight of iron. It is furthermore preferred to employ a catalyst in which both the nickel and iron are present in the form of Raney nickel and Raney iron.

The process is basically that of making a Raney nickel catalyst except that part of the nickel is replaced by iron. The basic process is described in U.S. Pat. No. 1,563,587, U.S. Pat. NO. 1,628,190 and U.S. Pat. No. 1,915,473.

This type of catalyst is also defined as a skeleton catalyst.

In making the catalyst material, nickel and iron are alloyed with a nonprecious metal, e.g. aluminum and this nonprecious component is then eliminated by a solution step so as to obtain the activated catalyst material.

However it is also possible to proceed initially from a mixture of a Raney nickel alloy and a Raney iron alloy.

A similar catalyst can also be obtained if solutions containing Ni and Fe ions are used to impregnate a suitable carrier material. After drying of this material the cations are reduced to metallic nickel and iron in one of the well-known manners.

It is preferred that the catalyst material be in the form of a catalyst body which has a so-called double skeleton catalyst structure as described in the U.S. Pat. No. 2,928,891 hereby incorporated by reference.

In order to obtain the double structure, the Raney catalyst which contains the nickel and the iron is subjected to pressing in the form of a fine powder with a pulverulent support material e.g. carbonyl nickel followed by sintering or by hot-pressing.

In the following examples various nickel-iron catalysts in the Raney form were investigated to determine the efficiency of the catalyst in the decomposition of aqueous sodium borane ($NaBH_4$) solutions, the sodium borane being present in a 1 N NaOH solution. The decomposition occurs according to the following equations:

$$NaBH_4 + H_2O \rightarrow 4H_2 + NaBO_2$$
$$\Delta H_{25°C} = -63.8 \text{ kcal./mol}$$

EXAMPLES 1-6

100 ml. of a 15% concentration sodium borane solution was reacted in a two-neck flask with 1 g. of various catalysts, as indicated below. In spite of the small amount of catalyst, the decomposition reaction in most cases was rather violent. Within a short time, a large amount of heat was liberated which caused a rapid rise of the temperature. It was therefore not possible to carry out the decompositions at a specific thermostat-controlled temperature In order to compare the decomposition speed in case of the different catalysts, the rise in temperature of the solution and the generated amount of gas were measured as functions of time.

The different catalysts employed appear from the following table I:

TABLE I

| Catalyst | Iron content | Grain size |
|---|---|---|
| 1. Raney-nickel | 0.15 wt. % | 40–100 μ |
| 2. Raney-Ni/Fe | 5 wt. % | 100 μ |
| 3. Raney-Ni/Fe | 10 wt. % | 100 μ |
| 4. Raney-Ni/Fe | 10 wt. % | of about 25 mm.³ |
| 5. Raney-Ni/Fe | 20 wt. % | 100 μ |
| 6. Raney-Ni/Fe | 50 wt. % | 100 μ |

The results obtained in this test procedure are shown in FIG. 1, As can be seen, more than 55 minutes were necessary to generate an amount of 40 normal liters $H_2$ with a straight Raney-nickel catalyst. This same result could be accomplished in about 9 minutes with a 5% iron-containing nickel catalyst, and in about 4 to 5 minutes with a 10% iron-nickel catalyst. The catalyst in this case was in a pulverulent condition. If used as a single piece, the results were less favorable, as indicated in the drawing.

Further data are included also in the following Table II which shows the amount of gas obtained with different catalysts after a reaction time of 4 minutes:

TABLE II

| Catalyst | Iron content, weight percent | $H_2$* | Temperature of the solution, °C. |
|---|---|---|---|
| Raney-nickel | 0.15 | 0.46 | 25 |
| Ra-Ni/Fe (100μ) | 5.0 | 3.52 | 41 |
| Ra-Ni/Fe (one piece) | 10.0 | 4.02 | 45 |
| Ra-Ni/Fe (100μ) | 10.0 | 40.00 | 89 |
| Ra-Ni/Fe (100μ) | 20.0 | 39.98 | 89 |
| Ra-Ni/Fe (100μ) | 50.0 | 38.20 | 88 |

*Liters under normal conditions=NL.

As can be seen from FIG. 1 of the drawing and the above tables, the decomposition of a Raney catalyst with 10, 20 or 50% iron was almost complete after 4 minutes since the maximum amount of hydrogen obtainable by decomposition of 100 ml. of a 15% sodium borane solution is 43.6 NL.

The performance between the mixed catalysts having 10, 20 or 50 wt. % of iron is about the same. Nevertheless, a nickel catalyst with 10% by weight of iron is preferred for the purposes of the invention because it has an optimal activity and can better be stored.

Figure 2:
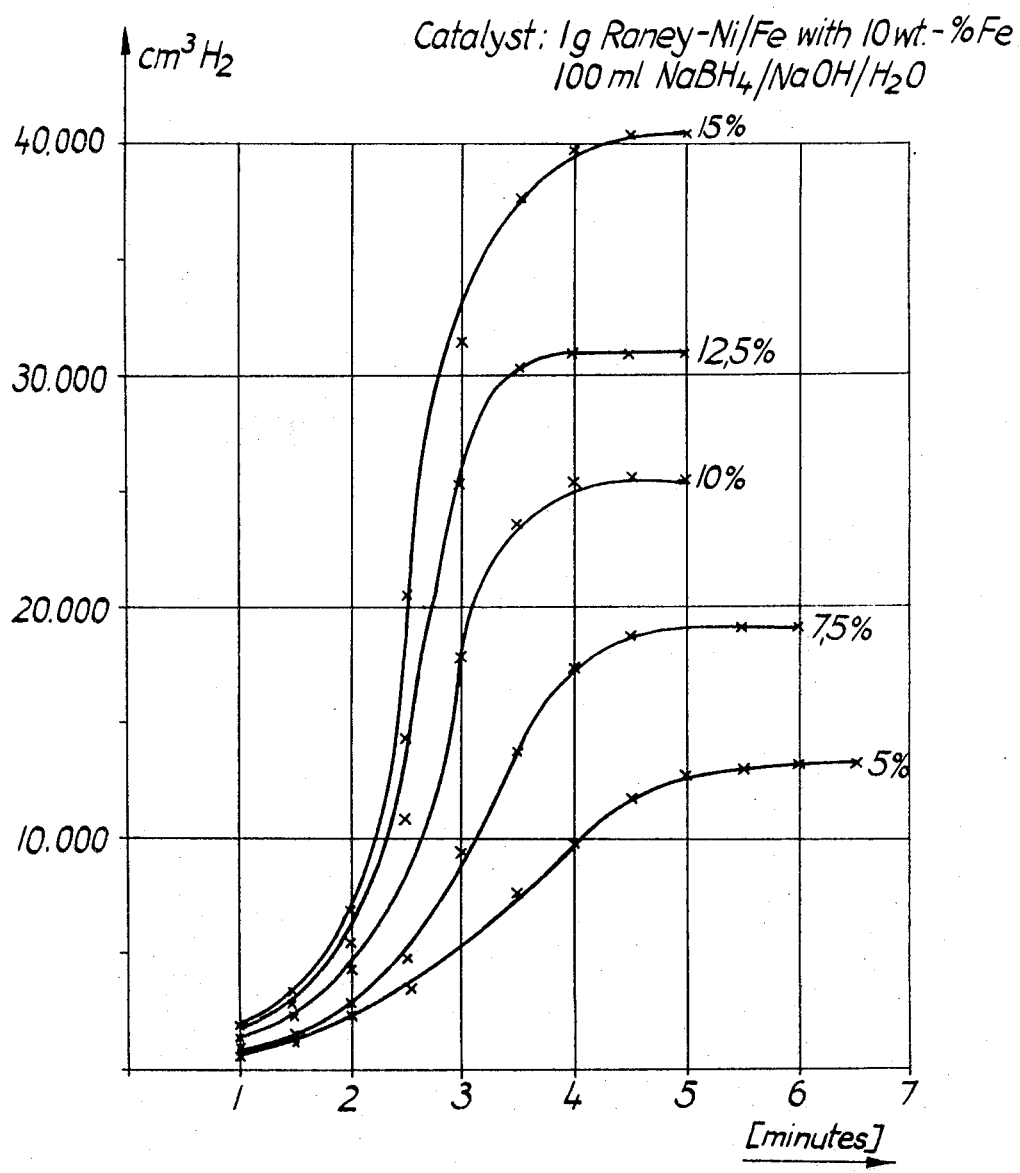
FIG. 2 shows the reaction time necessary to obtain the indicated volumes of hydrogen with a 10% iron-nickel catalyst of the Raney form using varying concentrations of an aqueous sodium borane solution.

Another test series concerned the most favorable concentration of sodium borane. In view of the preference just stated, this test series were carried out with a mixed catalyst having a 10 wt. % iron content. The amount of hydrogen. generated after 4 minutes in case of various NaBH$_4$ concentrations appears from the following table. The relation to time is also further illustrated by FIG. 2 of the drawing.

TABLE III

| NaBH$_4$—concentration in 1 N NaOH (aqueous) | H$_2$ (Nl) | temperature of the solution |
| --- | --- | --- |
| 5.0 wt. % | 9.66 | 65° C. |
| 7.5 wt. % | 17.65 | 78° C. |
| 10.0 wt. % | 25.27 | 84° C. |
| 12.5 wt. % | 31.00 | 86° C. |
| 15.0 wt. % | 40.00 | 89° C. |

The table shows that the amount of hydrogen generated within a given period of time also depends on the concentration of sodium borane used. As can be seen, a concentration of 15 wt. % results in an optimum output. A further increase of the sodium borane concentration would not be desirable since, in that case, sodium metaborate (NaBO$_2$) formed during the reaction has the small solubility at 19°C. of 27.2 g. in 100 g. water. After cooling down of the apparatus, the sodium metaborate will therefore have a tendency to crystallize out.

The water balance, in case of the decomposition of 1 liter of a 15 wt. % concentration of NaBH$_4$ solution, appears as follows:

TABLE IV

| density of the solution | 1.0361 g./cm.$^3$ |
| --- | --- |
| composition of 1 liter solution: | 184.1 g. NaBH$_4$ |
|  | 40.0 g. NaOH |
|  | 812.0 g. H$_2$O |
|  | 1036.1 g. |
| H$_2$O-consumption during the reaction: | 175.10 ml. |
| H$_2$O-consumption during dissolving of 320.2 g. NaBO$_2$ at 19° C. | 1177.00 ml. |
| H$_2$O-consumption during dissolving of 40 g. NaOH at 20° C. | 36.70 ml. |
| required amount of water: | 1388.80 ml. |
| amount of water present: | 812.00 ml. |
| deficiency in amount of water: | 576.80 ml. |

This last table shows that, with the decomposition of 1 liter of a 15 wt. % concentration NaBH$_4$ solution, the amount of water is short by 576.8 ml. to prevent crystallization of NaBO$_2$ at about 20°C. With a decomposition of 1 liter of a 10% sodium borane solution, the water balances, since the required amount of water 882.9 ml. and the amount of water actually present is 882.0 ml. This explains why the use of a 10% NaBH$_4$ solution is preferred, when the reaction is balanced so that the temperature of the solutions does not exceed room temperature. Since the solution attains during decomposition a temperature of about 80°to 90°C. the solubility of NaBO$_2$ is high enough to use NaBH$_4$ solutions having concentrations of about 15 wt. %. Attention must also be given to the possibility that small water losses may occur by entrainment in the gas stream.

The crystallization of sodium metaborate can furthermore also be prevented by rinsing the apparatus with water after the decomposition.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In the process of generating hydrogen by catalytic decomposition of a boron hydride in an aqueous medium in which the boron hydride reacts with the water to produce hydrogen, the improvement which consists in effecting the decomposition of a water-soluble borane of about 10 to 15% concentration by weight in the presence of a pulverulent mixed crystal Raney catalyst having from 50 to 90% by weight nickel and from 10 to 50% by weight iron in the lattice structure.

2. The process of claim 1, wherein the iron content in the Raney catalyst is between 10 and 15%.

3. The process of claim 1, wherein the catalyst is in the form of a catalyst body having a double skeleton structure by being embedded in a metallic matrix.

4. The process of claim 1, wherein the water-soluble borane is an alkali borane.

5. The process of claim 4, wherein the alkali borane is sodium borane.

6. The process of claim 1, wherein sodium borane is employed in a concentration of about 15 wt. % and the iron contents of the catalyst is about 10 to 15 wt. % and the grain size of the catalyst is about 100 $\mu$.

* * * * *